United States Patent
Okamura et al.

(10) Patent No.: US 11,901,848 B2
(45) Date of Patent: Feb. 13, 2024

(54) ROTATING ELECTRIC MACHINE AND ARMATURE

(71) Applicant: DENSO CORPORATION, Kariya (JP)

(72) Inventors: Tomoyuki Okamura, Kariya (JP); Kensuke Hirai, Kariya (JP); Tadahiro Kurasawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 17/512,029

(22) Filed: Oct. 27, 2021

(65) Prior Publication Data

US 2022/0140770 A1    May 5, 2022

(30) Foreign Application Priority Data

Oct. 29, 2020    (JP) ................... 2020-181142

(51) Int. Cl.
   *H02P 29/64*     (2016.01)
   *H02K 11/25*     (2016.01)
   *H02K 3/28*      (2006.01)

(52) U.S. Cl.
   CPC ........... *H02P 29/64* (2016.02); *H02K 3/28* (2013.01); *H02K 11/25* (2016.01)

(58) Field of Classification Search
   CPC ......... H02P 29/64; H02K 3/28; H02K 11/25; H02K 2203/09; H02K 3/50
   USPC ....................... 318/473, 471, 445
   See application file for complete search history.

(56) References Cited

U.S. PATENT DOCUMENTS

| | | | |
|---|---|---|---|
| 2,028,528 | A | 1/1936 | Sipe |
| 6,137,198 | A | 10/2000 | Kawamura |
| 2005/0253466 | A1 | 11/2005 | Seguchi et al. |
| 2012/0235524 | A1 | 9/2012 | Sasaki et al. |

(Continued)

FOREIGN PATENT DOCUMENTS

| | | |
|---|---|---|
| CN | 201627798 U | 11/2010 |
| EP | 3280034 A1 | 2/2018 |

(Continued)

OTHER PUBLICATIONS

Duquesne et al.; "Rotary Electric Motor Provided with an Interconnector Having Supporting Jacks"; Feb. 7, 2018; EP 3280034 (English Machine Translation) (Year: 2018).

(Continued)

*Primary Examiner* — David Luo
(74) *Attorney, Agent, or Firm* — Oliff PLC

(57) ABSTRACT

A rotating electric machine includes a neutral busbar and a temperature sensor. The neutral busbar has a main body and a bent part that retains the temperature sensor therein. The main body has first and second parts each of which has one or more connection terminals formed therein. The bent part is formed between a circumferential end portion of the first part and a circumferential end portion of the second part. In the first part, there is formed, between the circumferential end portion of the first part and a closest connection terminal formed in the first part to the bent part, a first extending portion that extends axially or radially. Similarly, in the second part, there is formed, between the circumferential end portion of the second part and a closest connection terminal formed in the second part to the bent part, a second extending portion that extends axially or radially.

6 Claims, 7 Drawing Sheets

(56) References Cited

U.S. PATENT DOCUMENTS

2013/0270973 A1* 10/2013 Ikemoto ............... H02K 11/25
310/68 C
2015/0364955 A1    12/2015 Aumann

FOREIGN PATENT DOCUMENTS

| EP | 3 451 506 A1 | 3/2019 |
| FR | 3 053 543 A1 | 1/2018 |
| JP | S50-0139201 U | 11/1975 |
| JP | H05-308742 A | 11/1993 |
| JP | 2016-025744 A | 2/2016 |
| JP | 5996917 B2 | 9/2016 |
| JP | 2019-110676 A | 7/2019 |

OTHER PUBLICATIONS

Jan. 25, 2023 Office Action issued in U.S. Appl. No. 17/512,025.
U.S. Appl. No. 17/512,025, filed Oct. 27, 2021 in the name of Kensuke Hirai et al.

* cited by examiner

ROTATING ELECTRIC MACHINE AND ARMATURE

CROSS-REFERENCE TO RELATED APPLICATION

This application is based on and claims priority from Japanese Patent Application No. 2020-181142 filed on Oct. 29, 2020, the entire contents of which are hereby incorporated by reference into this application.

BACKGROUND

1 Technical Field

The present disclosure relates to rotating electric machines and armatures.

2 Description of Related Art

There are known rotating electric machines that include an armature having a three-phase armature coil wound on an armature core.

Moreover, there is also known a method of Y-connecting (or star-connecting) the three-phase armature coil via a neutral busbar to define a neutral point of the armature coil, for example as disclosed in Japanese Patent Application Publication No. JP 2019-110676 A (to be referred to as Patent Document 1 hereinafter) and Japanese Patent No. JP 5996917 B2 (to be referred to as Patent Document 2 hereinafter).

Furthermore, Patent Documents 1 and 2 also disclose a method of detecting the temperature of the armature coil with a temperature sensor fixed to the neutral busbar.

Specifically, according to the disclosure of Patent Document 1, the neutral busbar has a bent part formed in a main body thereof. The bent part is bent back in a substantially U-shape toward the radially inner periphery of a stator that serves as the armature. The temperature sensor is sandwiched and thereby retained in the bent part.

Similarly, according to the disclosure of Patent Document 2, the temperature sensor is also retained in a substantially U-shaped bent part formed in a main body of the neutral busbar. Moreover, according to the disclosure of Patent Document 2, a fixing member is formed by resin molding so as to have both the bent part of the neutral busbar and the temperature sensor fixed therein. In addition, during the resin molding of the fixing member, pressing members are used to press the bent part of the neutral busbar and the temperature sensor together so as to keep the temperature sensor in contact with the bent part of the neutral busbar.

SUMMARY

According to the present disclosure, there is provided a rotating electric machine which includes an armature, a neutral busbar and a temperature sensor. The armature includes an annular armature core and a three-phase armature coil wound on the armature core and Y-connected to define a neutral point thereof. The neutral busbar is configured to connect neutral-point-side winding end portions of the armature coil. The temperature sensor is mounted to the neutral busbar to detect a temperature of the armature coil. The neutral busbar has a main body extending in a circumferential direction of the armature, a plurality of connection terminals formed in the main body and joined respectively to the neutral-point-side winding end portions of the armature coil, and a bent part sandwiching and thereby retaining the temperature sensor therein. The main body of the neutral busbar has a first part and a second part located apart from each other in the circumferential direction and each having one or more of the connection terminals formed therein. The bent part is formed between a circumferential end portion of the first part and a circumferential end portion of the second part to electrically connect the first and second parts. In the first part, there is formed a first extending portion between the circumferential end portion of the first part and a closest one of the one or more connection terminals formed in the first part to the bent part in the circumferential direction; the first extending portion extends in an axial direction or a radial direction of the armature. In the second part, there is formed a second extending portion between the circumferential end portion of the second part and a closest one of the one or more connection terminals formed in the second part to the bent part in the circumferential direction; the second extending portion also extends in the axial direction or a radial direction of the armature.

DESCRIPTION OF EMBODIMENTS

Figure 1:
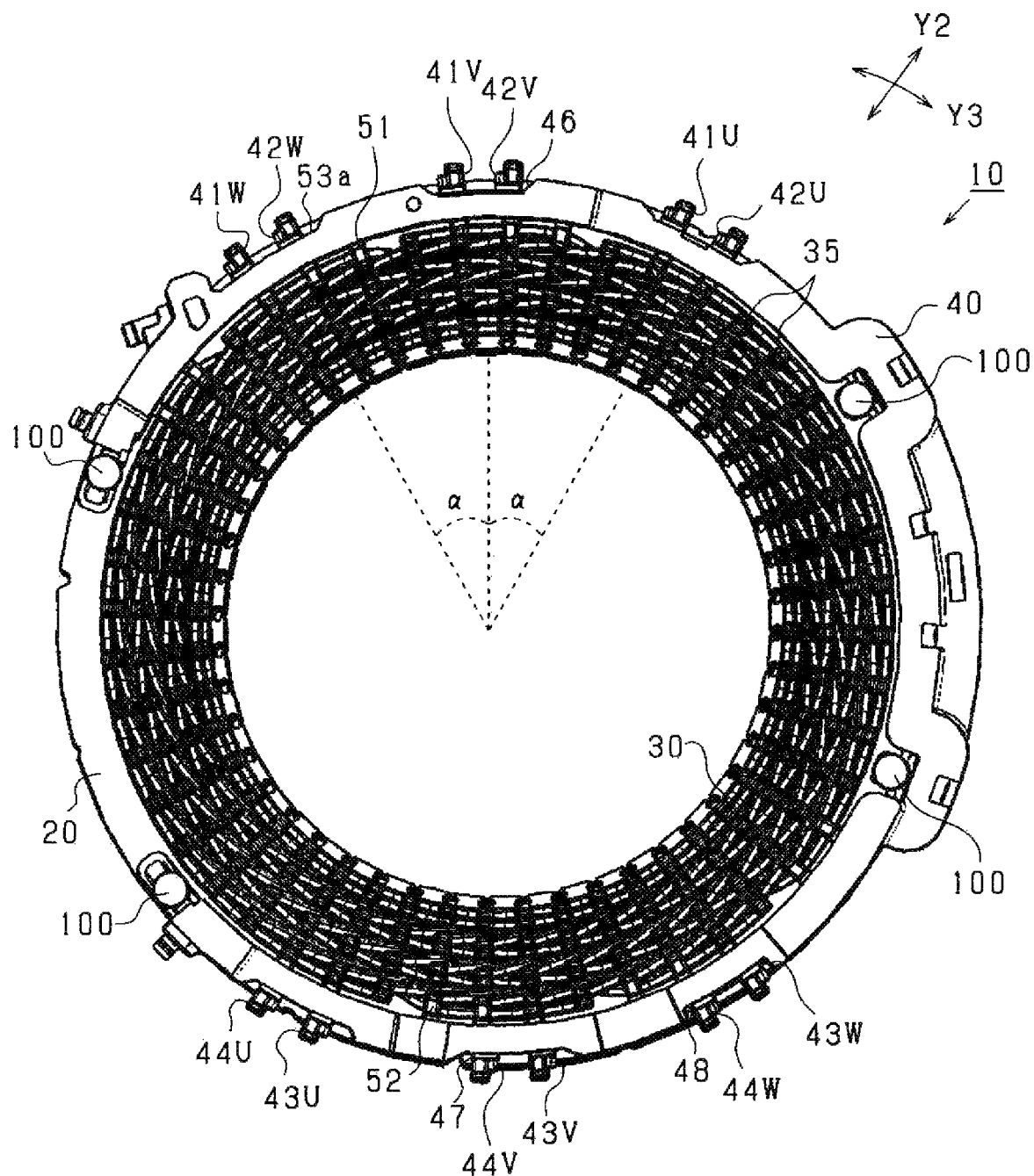
FIG. 1 is a plan view of a stator of a rotating electric machine according to an exemplary embodiment.

According to the disclosure of the aforementioned Patent Documents 1 and 2, the bent part is formed by bending a part of the main body of the neutral busbar. Moreover, on each side of the bent part, there is formed at least one connection terminal in the main body of the neutral busbar. In general, during the assembly of the neutral busbar to the armature, the positions of the connection terminals of the neutral busbar are adjusted so as to allow the connection terminals to be respectively joined to winding end portions of the armature coil. However, during the position adjustment of the connection terminals, strain may be induced in the bent part of the neutral busbar, causing the opening of the substantially U-shaped bent part to spread. Consequently, it would become difficult to reliably retain the temperature sensor in the bent part of the neutral busbar. As a result, it would become difficult to reliably suppress displacement of the temperature sensor; it would also become difficult to reliably keep the temperature sensor in contact with the bent part of the neutral busbar.

In addition, according to the disclosure of Patent Document 2, the pressing members are removed upon completion of the resin molding of the fixing member. Therefore, the position adjustment of the connection terminals is performed without the pressing members pressing the bent part of the neutral busbar and the temperature sensor together. Consequently, it would still be difficult to avoid the above-described problems.

The present disclosure has been accomplished in view of the above-described problems.

With the configuration of the above-described rotating electric machine according to the present disclosure, when those portions of the first and second parts which have the connection terminals formed therein are slightly deformed, strain induced by the deformation will be absorbed by the first and second extending portions. Consequently, it becomes possible to suppress deformation of the bent part when the positions of the connection terminals are adjusted to allow the connection terminals to be respectively joined to the neutral-point-side winding end portions of the armature coil. That is, the first and second extending portions serve as buffer members to absorb strain induced in the first and second parts during the position adjustment of the connection terminals. Hence, it becomes possible to suppress displacement of the temperature sensor due to deformation of the bent part; it also becomes possible to prevent the contact between the temperature sensor and the bent part from becoming insufficient due to deformation of the bent part. As a result, it becomes possible to prevent the accuracy of detecting the temperature of the armature coil by the temperature sensor from being lowered.

In further implementations, the bent part may have a pair of sandwiching surfaces between which the temperature sensor is sandwiched. Moreover, both the sandwiching surfaces of the bent part may be formed to extend perpendicular to the axial direction of the armature. In this case, it is possible to place the temperature sensor in surface contact with the bent part of the neutral busbar; thus it is easy to position the temperature sensor in the axial direction.

The bent part may be formed to radially protrude from the main body of the neutral busbar and bent back in the axial direction into a substantially U-shape. The bent part may have a first opening end portion connected with the circumferential end portion of the first part of the main body and a second opening end portion connected with the circumferential end portion of the second part of the main body. Both the neutral busbar and the temperature sensor may be covered with a resin member and thereby integrated into one piece. The resin member may have a pair of first and second through-holes through which the first and second opening end portions of the bent part are respectively exposed from the resin member in the axial direction; the pair of first and second through-holes respectively correspond to a pair of first and second pressing members used to press the bent part of the neutral busbar and the temperature sensor together respectively from opposite axial sides of the bent part during resin molding of the resin member. The circumferential end portion of the first part and the second extending portion may face each other in the circumferential direction. The first through-hole may be formed in the resin member so as to protrude, between the circumferential end portion of the first part and the second extending portion, from the circumferential end portion of the first part toward the second extending portion.

In the above case, the bent part opens on the radially inner side as well as on both the circumferential sides. Consequently, it is possible to adjust the mounting angle of the temperature sensor in the radial direction and/or the circumferential direction, thereby facilitating the mounting of the temperature sensor to the bent part of the neutral busbar.

Moreover, in the above case, it is possible to cover both the neutral busbar and the temperature sensor with the resin member while pressing the bent part of the neutral busbar and the temperature sensor together using the pair of first and second pressing members. Consequently, it is possible to locate the temperature sensor at a desired position; it is also possible to reliably place the temperature sensor in contact with the bent part of the neutral busbar.

Furthermore, in the above case, during the resin molding of the resin member, the first pressing member corresponding to the first through-hole is provided to protrude, between the circumferential end portion of the first part and the second extending portion, from the circumferential end portion of the first part toward the second extending portion. Therefore, during the resin molding, if the neutral busbar is distorted and thereby causes the second extending portion to approach the circumferential end portion of the first part, the first pressing member will interfere with the second extending portion, thereby preventing the second extending portion from making contact with the circumferential end portion of the first part. Consequently, it is possible to prevent a short circuit from being formed between the first and second parts; thus it is possible to prevent electric current from flowing between the first and second parts without passing through the bent part. In other words, it is possible to reliably have electric current flow between the first and second parts through the bent part. As a result, it is possible to reliably prevent the accuracy of detecting the temperature of the armature coil by the temperature sensor from being lowered.

Both the neutral busbar and the temperature sensor may be covered with a resin member and thereby integrated into one piece. In the resin member, there may be formed at least one hook-shaped holding member to hold a lead wire of the temperature sensor. In this case, with the at least one holding member holding (or temporarily fixing) the lead wire, during delivery of the neutral busbar before connection of the lead wire to the temperature sensor, it is possible to prevent the lead wire from hanging from the neutral busbar and thus from hindering the assembly of the neutral busbar to the armature.

Moreover, the at least one holding member may be formed of a resin and integrally with the resin member into one piece. The at least one holding member may have a contact surface for making contact with the lead wire of the temperature sensor. The contact surface may be formed as a smooth flat surface or a smooth curved surface. In this case, there are no concavities/convexities in the contact surface, i.e., no undercuts in the contact surface. Therefore, the at least one holding member can be easily resin-molded together with the resin member.

According to another aspect of the present disclosure, there is provided an armature which includes an annular armature core, a three-phase armature coil, a neutral busbar and a temperature sensor. The armature coil is wound on the armature core and Y-connected to define a neutral point thereof. The neutral busbar is configured to connect neutral-point-side winding end portions of the armature coil. The temperature sensor is mounted to the neutral busbar to detect a temperature of the armature coil. The neutral busbar has a main body extending in a circumferential direction of the armature, a plurality of connection terminals formed in the main body and joined respectively to the neutral-point-side winding end portions of the armature coil, and a bent part sandwiching and thereby retaining the temperature sensor therein. The main body of the neutral busbar has a first part and a second part located apart from each other in the circumferential direction and each having one or more of the connection terminals formed therein. The bent part is formed between a circumferential end portion of the first part and a circumferential end portion of the second part to electrically connect the first and second parts. In the first part, there is formed a first extending portion between the circumferential end portion of the first part and a closest one of the one or more connection terminals formed in the first part to the bent part in the circumferential direction; the first extending portion extends in an axial direction or a radial direction of the armature. In the second part, there is formed a second extending portion between the circumferential end portion of the second part and a closest one of the one or more connection terminals formed in the second part to the bent part in the circumferential direction; the second extending portion also extends in the axial direction or a radial direction of the armature.

With the above configuration of the armature according to the present disclosure, it is possible to achieve the same advantageous effects as achievable with the configuration of the above-described rotating electric machine according to the present disclosure.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

FIG. 1 shows the overall structure of a stator 10 of a rotating electric machine according to an exemplary embodiment.

In the present embodiment, the rotating electric machine is configured as an electric motor for use in a vehicle. Specifically, the electric motor is a three-phase permanent magnet synchronous motor. The electric motor includes the stator 10 shown in FIG. 1, which is cylindrical-shaped and serves as an armature, and a rotor (not shown in the drawings) that is rotatably disposed radially inside the stator 10 and serves as a field system.

In the present embodiment, the rotor may have any well-known configuration. For example, the rotor may be configured as either an IPM (Interior Permanent Magnet) rotor or an SPM (Surface Permanent Magnet) rotor. Moreover, the rotor may alternatively be configured as a field coil type rotor. In addition, the rotor is disposed relative to the stator 10 so as to be rotatable about an axis of rotation.

In the present embodiment, the axial direction (indicated by an arrow Y1 in the drawings) denotes the axial direction of the cylindrical stator 10, i.e., the direction in which the axis of rotation of the rotor extends. The radial directions (indicated by an arrow Y2 in the drawings) denote the radial directions of the cylindrical stator 10, i.e., the directions of extending radially from the axis of rotation of the rotor. The circumferential direction (indicated by an arrow Y3 in the drawings) denotes the circumferential direction of the cylindrical stator 10, i.e., the direction of extending along a circle whose center is on the axis of rotation of the rotor.

Figure 2:
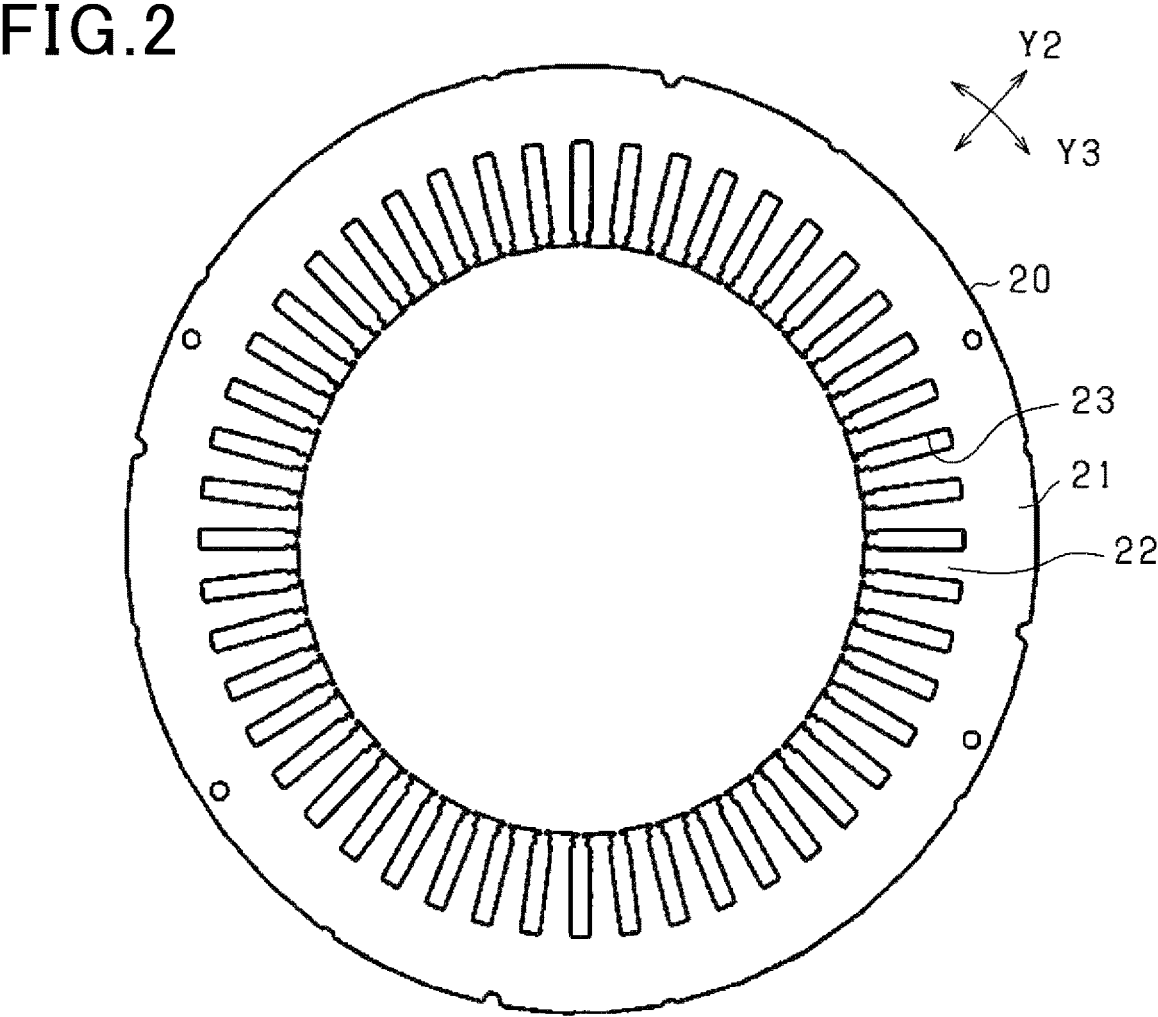
FIG. 2 is a plan view of a stator core of the stator.

As shown in FIGS. 1 and 2, the stator 10 includes an annular stator core 20 that is arranged radially outside the rotor so as to radially face the rotor, a three-phase stator coil 30 wound on the stator core 20, and a busbar unit 40 configured to connect winding end portions of the stator coil 30. In addition, in the present embodiment, the stator core 20 serves as an armature core while the stator coil 30 serves as an armature coil.

As shown in FIG. 2, the stator core 20 has an annular back yoke (or back core) 21, a plurality of teeth 22 and a plurality of slots 23. The teeth 22 each protrude radially inward from the back yoke 21 and are arranged at predetermined intervals in the circumferential direction Y3. Each of the slots 23 is formed between a circumferentially-adjacent pair of the teeth 22. More particularly, in the present embodiment, the slots 23 are formed in the stator core 20 at equal intervals in the circumferential direction Y3. In addition, the stator coil 30 is wound around the teeth 22 so as to be received in the slots 23.

In the present embodiment, the stator coil 30 is formed by inserting, from a first axial side of the stator core 20, a plurality of substantially U-shaped electrical conductor segments 35 into the slots 23 of the stator core 20 and joining each corresponding pair of end portions of the electrical conductor segments 35 which protrude outside the slots 23 on a second axial side of the stator core 20. Each of the electrical conductor segments 35 is obtained by cutting and plastically deforming an electrical conductor, which has a substantially rectangular cross-sectional shape and a constant thickness, into the substantially "U" shape. In addition, the above method of forming the stator coil 30 is well-known in the art; therefore, detailed explanation of the method is omitted hereinafter.

Figure 3:
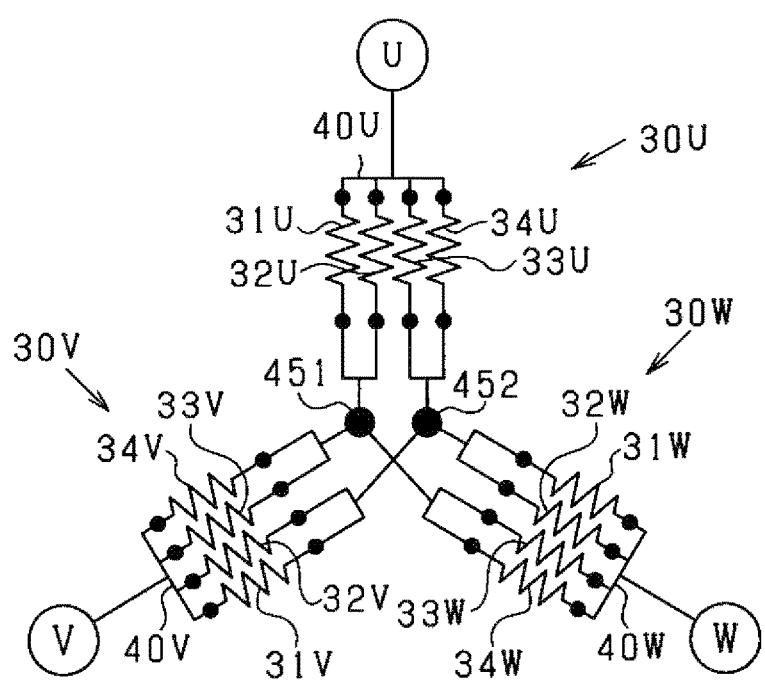
FIG. 3 is a connection diagram of a stator coil of the stator.

As shown in FIG. 3, in the present embodiment, the stator coil 30 includes a U-phase winding 30U, a V-phase winding 30V and a W-phase winding 30W that are Y-connected (or star-connected) together. Each of the U-phase, V-phase and W-phase windings 30U, 30V and 30W is constituted of four partial windings that are connected in parallel with each other. More specifically, the U-phase winding 30U is constituted of four partial windings 31U-34U that are connected in parallel with each other; the V-phase winding 30V is constituted of four partial windings 31V-34V that are connected in parallel with each other; and the W-phase winding 30W is constituted of four partial windings 31W-34W that are connected in parallel with each other.

The stator coil 30 is connected, via an electric power converter such as an inverter (not shown in the drawings), to an electric power supply such as a battery pack (not shown in the drawings). The stator coil 30 generates magnetic flux upon being supplied with electric power (more specifically, three-phase AC power) from the electric power supply via the electric power converter.

In the stator coil 30, the U-phase, V-phase and W-phase windings 30U, 30V and 30W are connected to power wires via the busbar unit 40; the power wires are further connected to the electric power converter. Moreover, the U-phase, V-phase and W-phase windings 30U, 30V and 30W are Y-connected via the busbar unit 40.

Figure 4:
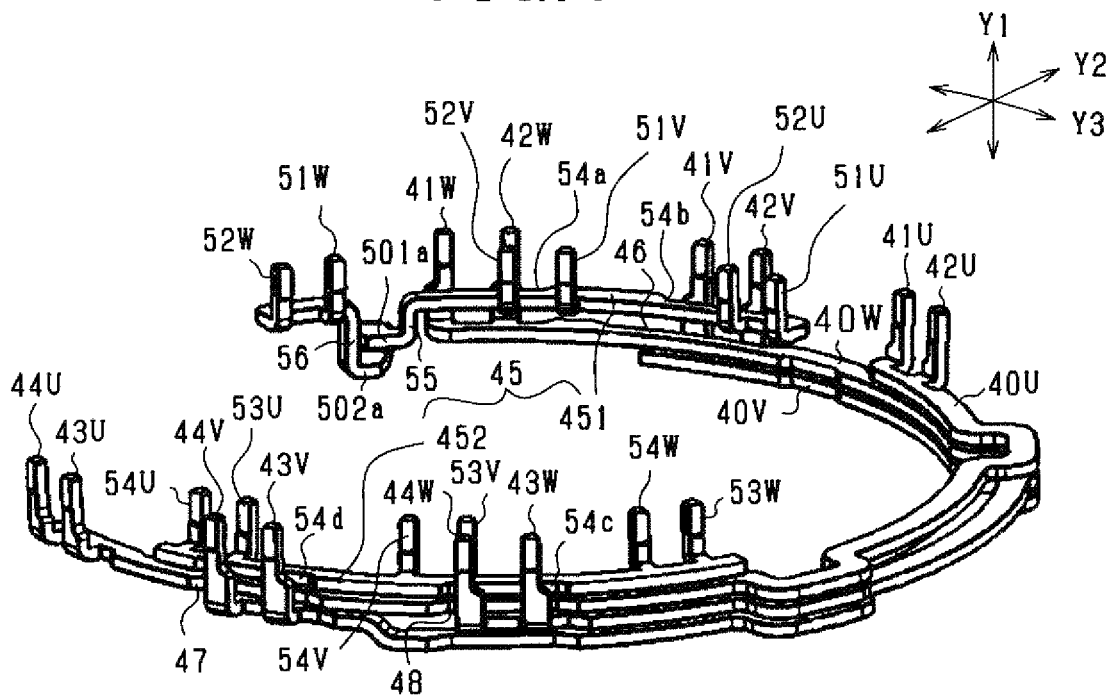
FIG. 4 is a perspective view showing the stacked state of busbars in a busbar unit of the stator.
Figure 5:
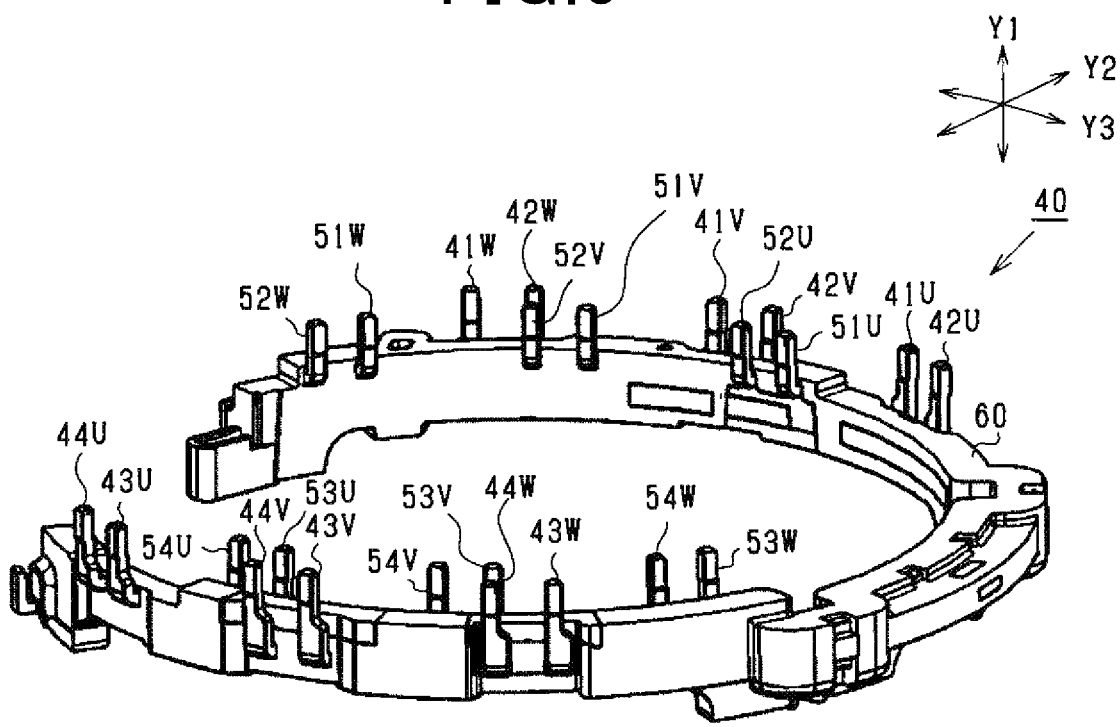
FIG. 5 is a perspective view of the busbar unit.

As shown in FIG. 4, the busbar unit 40 includes: a U-phase busbar 40U for connecting end portions of the partial windings 31U-34U of the U-phase winding 30U; a V-phase busbar 40V for connecting end portions of the partial windings 31V-34V of the V-phase winding 30V; a W-phase busbar 40W for connecting end portions of the partial windings 31W-34W of the W-phase winding 30W; and a neutral busbar 45 for forming a neutral line (or neutral point) of the stator coil 30. Moreover, as shown in FIGS. 4 and 5, all of the U-phase, V-phase and W-phase busbars 40U-40W and the neutral busbar 45 are stacked in the axial direction Y1 and together covered with a resin member 60, thereby being integrated into one piece.

Referring back to FIG. 1, in the present embodiment, the busbar unit 40 is arranged on one axial side of the stator core 20 and fixed to the back yoke 21 of the stator core 20 by a plurality of fixing members (e.g., pins) 100. Moreover, the busbar unit 40 is located radially outside the stator coil 30 and within the range of the radial dimension of the back yoke 21 of the stator core 20. In addition, the busbar unit 40 is located also within the range of the axial dimension of a coil end of the stator coil 30. Here, the coil end denotes that part of the stator coil 30 which protrudes from the stator core 20 on the axial side thereof where the busbar unit 40 is arranged.

As shown in FIG. 4, each of the U-phase, V-phase and W-phase busbars 40U-40W is formed of a flat wire having a substantially rectangular cross-sectional shape. The U-phase, V-phase and W-phase busbars 40U-40W are stacked in the axial direction Y1 with the longer sides of rectangular cross sections of the busbars 40U-40W facing one another. That is, the U-phase, V-phase and W-phase busbars 40U-40W are stacked in the axial direction Y1 with major surfaces of the busbars 40U-40W facing one another. Here, the major surfaces denote those surfaces of the busbars 40U-40W which have a largest area among all the surfaces of the busbars 40U-40W. Moreover, the U-phase, V-phase and W-phase busbars 40U-40W are spaced from one another by a predetermined distance in the axial direction Y1. The resin member 60 is interposed between the U-phase, V-phase and W-phase busbars 40U-40W, thereby electrically insulating them from one another.

In the present embodiment, of the U-phase, V-phase and W-phase busbars 40U-40W, the V-phase busbar 40V is located closest to the stator core 20 in the axial direction Y1; the U-phase busbar 40U is located furthest from the stator core 20 in the axial direction Y1; and the W-phase busbar 40W is located between the V-phase busbar 40V and the U-phase busbar 40U in the axial direction Y1. In other words, in the axial direction Y1, the V-phase busbar 40V is located at a lower layer; the W-phase busbar 40W is located at an intermediate layer; and the U-phase busbar 40U is located at an upper layer.

The V-phase busbar 40V has an arc shape in an axial view thereof. Moreover, the V-phase busbar 40V has two circumferential ends thereof located apart from each other by an angle of substantially 180° in the circumferential direction Y3. In circumferential end portions of the V-phase busbar 40V, there are formed four V-phase connection terminals 41V-44V to be respectively connected to the non-neutral-point-side end portions of the four partial windings 31V-34V of the V-phase winding 30V. More specifically, of the four V-phase connection terminals 41V-44V, the connection terminals 41V and 42V are formed in a first circumferential end portion of the V-phase busbar 40V; the remaining connection terminals 43V and 44V are formed in a second circumferential end portion of the V-phase busbar 40V. That is, the connection terminals 41V and 42V are located apart from the connection terminals 43V and 44V by an angle of substantially 180° in the circumferential direction Y3. In addition, in an axial view of the stator 10, the angle (or the amount of circumferential offset) between the connection terminals 41V and 42V is substantially equal to the angle (or the circumferential pitch) between the slots 23; the angle between the connection terminals 43V and 44V is also substantially equal to the angle between the slots 23 (see FIGS. 1 and 2).

Each of the V-phase connection terminals 41V-44V is formed at a radially outer periphery of the V-phase busbar 40V. More specifically, each of the V-phase connection terminals 41V-44V is bent to first protrude radially outward from the radially outer periphery of the V-phase busbar 40V and then axially extend to the opposite side to the stator core 20. Moreover, each of the V-phase connection terminals 41V-44V is formed to become thinner at a distal end portion thereof. To the distal end portions of the V-phase connection terminals 41V-44V, there are respectively joined the non-neutral-point-side end portions of the partial windings 31V-34V of the V-phase winding 30V by welding or the like. In addition, the V-phase busbar 40V is formed symmetrically in the circumferential direction Y3.

The W-phase busbar 40W has an arc shape in an axial view thereof. Moreover, the W-phase busbar 40W has two circumferential ends thereof located apart from each other by an angle of substantially 180° in the circumferential direction Y3. In circumferential end portions of the W-phase busbar 40W, there are formed four W-phase connection terminals 41W-44W to be respectively connected to the non-neutral-point-side end portions of the four partial windings 31W-34W of the W-phase winding 30W. More specifically, the W-phase connection terminals 41W-44W are formed in the same manner as the V-phase connection terminals 41V-44V described above.

The W-phase busbar 40W is stacked on the upper side of the V-phase busbar 40V (i.e., on the opposite side of the V-phase busbar 40V to the stator core 20) in the axial direction Y1 so as to be offset counterclockwise from the V-phase busbar 40V by a predetermined angle α in the circumferential direction Y3. Consequently, of first and second circumferential ends of the W-phase busbar 40W, the first circumferential end does not overlap the V-phase busbar 40V. That is, the first circumferential end of the W-phase busbar 40W protrudes counterclockwise from the first circumferential end of the V-phase busbar 40V by the predetermined angle α while the second circumferential end of the V-phase busbar 40V protrudes clockwise from the second circumferential end of the W-phase busbar 40W by the predetermined angle α.

The U-phase busbar 40U has an arc shape in an axial view thereof. Moreover, the U-phase busbar 40U has two circumferential ends thereof located apart from each other by an angle of substantially 180° in the circumferential direction Y3. In circumferential end portions of the U-phase busbar 40U, there are formed four U-phase connection terminals 41U-44U to be respectively connected to the non-neutral-point-side end portions of the four partial windings 31U-34U of the U-phase winding 30U. More specifically, the U-phase connection terminals 41U-44U are formed in the same manner as the V-phase connection terminals 41V-44V and the W-phase connection terminals 41W-44W described above.

The U-phase busbar 40U is stacked on the upper side of the W-phase busbar 40W (i.e., on the opposite side of the W-phase busbar 40W to the stator core 20) in the axial direction Y1 so as to be offset clockwise from the W-phase busbar 40W by (α×2) in the circumferential direction Y3, where a is the predetermined angle. That is, the U-phase busbar 40U is offset clockwise from the V-phase busbar 40V by the predetermined angle α in the circumferential direction Y3.

In the present embodiment, the neutral busbar 45 consists of a pair of first and second neutral busbars 451 and 452. Each of the first and second neutral busbars 451 and 452 has an arc shape in an axial view thereof. Moreover, each of the first and second neutral busbars 451 and 452 is shorter than the U-phase, V-phase and W-phase busbars 40U-40W and has a circumferential length corresponding to an angular range of (α×2), where a is the predetermined angle.

Both the first and second neutral busbars 451 and 452 are stacked on the upper side of the U-phase, V-phase and W-phase busbars 40U-40W (i.e., on the opposite side of the U-phase, V-phase and W-phase busbars 40U-40W to the stator core 20) in the axial direction Y1. Moreover, the first and second neutral busbars 451 and 452 are arranged apart from each other in the circumferential direction Y3. Specifically, the first neutral busbar 451 is arranged to protrude counterclockwise from the U-phase, V-phase and W-phase busbars 40U-40W. More particularly, in the present embodiment, the first neutral busbar 451 is offset counterclockwise by a predetermined angle from the W-phase busbar 40W that protrudes counterclockwise from both the U-phase and V-phase busbars 40U and 40V Moreover, the second neutral busbar 452 is located on the opposite side of the central axis of the stator 10 (or the axis of rotation of the rotor) to the first neutral busbar 451. In other words, the second neutral busbar 452 is offset from the first neutral busbar 451 by 180° in the circumferential direction Y3.

Figure 6:
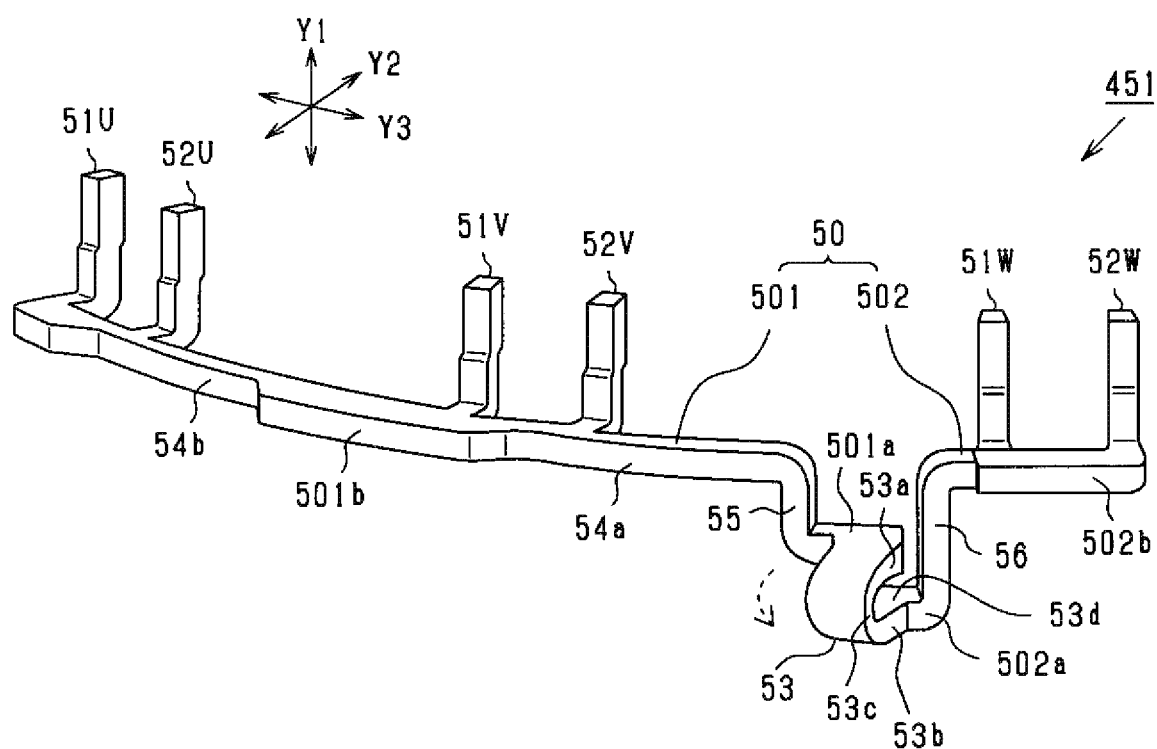
FIG. 6 is a perspective view of a first neutral busbar of the busbar unit.

As shown in FIG. 6, in the present embodiment, the first neutral busbar 451 is configured to have a main body 50, six connection terminals 51U, 52U, 51V, 52V, 51W and 52W, and a bent part 53. The main body 50 is formed to extend in the circumferential direction Y3. The connection terminals 51U, 52U, 51V, 52V, 51W and 52W are formed in the main body 50 so as to be respectively connected to the neutral-point-side end portions of the partial windings 31U and 32U of the U-phase winding 30U, the partial windings 33V and 34V of the V-phase winding 30V and the partial windings 33W and 34W of the W-phase winding 30W. The bent part 53 is formed to sandwich and thereby retain a temperature sensor 80 therein.

In addition, as shown in FIG. 3, the neutral-point-side end portions of the partial windings 31U and 32U connected with the first neutral busbar 451 are respectively on the opposite side to the non-neutral-point-side end portions of the partial windings 31U and 32U connected with the U-phase busbar 40U; the neutral-point-side end portions of the partial windings 33V and 34V connected with the first neutral busbar 451 are respectively on the opposite side to the non-neutral-point-side end portions of the partial windings 33V and 34V connected with the V-phase busbar 40V; and the neutral-point-side end portions of the partial windings 33W and 34W connected with the first neutral busbar 451 are respectively on the opposite side to the non-neutral-point-side end portions of the partial windings 33W and 34W connected with the W-phase busbar 40W.

As shown in FIG. 6, the main body 50 of the first neutral busbar 451 has a first part 501 and a second part 502 located apart from each other in the circumferential direction Y3. Each of the first and second parts 501 and 502 of the main body 50 is formed to have a substantially arc shape along the circumferential direction Y3. In addition, the first and second parts 501 and 502 of the main body 50 are formed of a flat wire that is radially flattened.

Of the six connection terminals formed in the main body 50 of the first neutral busbar 451, the connection terminals 51U, 52U, 51V and 52V are formed in the first part 501 of the main body 50. More specifically, as shown in FIGS. 4 and 6, in the first part 501 of the main body 50, the connection terminals 51U, 52U, 51V and 52V are arrange in the order of 52V→51V→52U→51U in the circumferential direction Y3 from the side where the first circumferential end of the busbar unit 40 is located.

Moreover, as shown in FIGS. 4 and 6, the connection terminals 51U, 52U, 51V and 52V are formed in pairs for respective phases; and the pair of the connection terminals 51U and 52U provided for the U-phase winding 30U and the pair of the connection terminals 51V and 52V provided for the V-phase winding 30V are offset from each other by the predetermined angle α in the circumferential direction Y3. In the present embodiment, each of the connection terminals 51U, 52U, 51V and 52V is formed at a radially inner periphery of the first part 501 of the main body 50. Furthermore, each of the connection terminals 51U, 52U, 51V and 52V is formed to extend from the radially inner periphery of the first part 501 of the main body 50 to the opposite side to the stator core 20 in the axial direction Y1. More specifically, each of the connection terminals 51U, 52U, 51V and 52V is bent to first protrude radially inward from the radially inner periphery of the first part 501 of the main body 50 and then axially extend to the opposite side to the stator core 20. To distal end portions of the connection terminals 51U, 52U, 51V and 52V, there are respectively joined the neutral-point-side end portions of the partial windings 31U, 32U, 33V and 34V by welding or the like.

The first part 501 of the main body 50 has a portion thereof radially overlapping the W-phase connection terminals 41W and 42W of the W-phase busbar 40W. Therefore, it is necessary to reliably secure electrical insulation between the first part 501 of the main body 50 and the W-phase connection terminals 41W and 42W. To this end, that portion of the first part 501 of the main body 50 which radially overlaps the W-phase connection terminals 41W and 42W is formed as a recessed portion 54a that is recessed radially inward so as to allow the W-phase connection terminals 41W and 42W to axially extend on the radially outer side of the first part 501 without making contact with the first part 501.

Moreover, the first part 501 of the main body 50 also has a portion thereof radially overlapping the V-phase connection terminals 41V and 42V of the V-phase busbar 40V. Therefore, it is also necessary to reliably secure electrical insulation between the first part 501 of the main body 50 and the V-phase connection terminals 41V and 42V. To this end, that portion of the first part 501 of the main body 50 which radially overlaps the V-phase connection terminals 41V and 42V is formed as a recessed portion 54b that is recessed radially inward so as to allow the V-phase connection terminals 41V and 42V to axially extend on the radially outer side of the first part 501 without making contact with the first part 501.

Furthermore, in the first part 501 of the main body 50, there is formed a first extending portion 55 between a circumferential end portion 501a of the first part 501 on the second part 502 side and the connection terminal 52V that is located closest to the second part 502 of the main body 50 among all the connection terminals 51U, 52U, 51V and 52V formed in the first part 501; the first extending portion 55 extends in the axial direction Y1. Consequently, with the first extending portion 55, the circumferential end portion 501a of the first part 501 is offset downward (i.e., toward the stator core 20) in the axial direction Y1 from a connection portion 501b of the first part 501; in the connection portion 501b, there are formed the connection terminals 51U, 52U, 51V and 52V.

Specifically, as shown in FIG. 4, the axial length of the first extending portion 55 is set so that after the first neutral busbar 451 is stacked on the U-phase, V-phase and W-phase busbars 40U-40W, the circumferential end portion 501a of the first part 501 is located at substantially the same axial position as the W-phase busbar 40W that is arranged at the intermediate layer in the stack of the U-phase, V-phase and W-phase busbars 40U-40W.

On the other hand, of the six connection terminals formed in the main body 50 of the first neutral busbar 451, the connection terminals 51W and 52W are formed in the second part 502 of the main body 50. More specifically, as shown in FIGS. 4 and 6, in the second part 502 of the main body 50, the connection terminals 51W and 52W are arranged in the order of 52W→51W in the circumferential direction Y3 from the side where the first circumferential end of the busbar unit 40 is located. Moreover, each of the connection terminals 51W and 52W is formed in the same manner as the connection terminals 51U, 52U, 51V and 52V described above. To distal end portions of the connection terminals 51W and 52W, there are respectively joined the neutral-point-side end portions of the partial windings 33W and 34W by welding or the like.

Furthermore, in the second part 502 of the main body 50, there is formed a second extending portion 56 between a circumferential end portion 502a of the second part 502 on the first part 501 side and the connection terminal 51W that is located closer than the connection terminal 52W to the first part 501; the second extending portion 56 also extends in the axial direction Y1 as the first extending portion 55 described above. Consequently, with the second extending portion 56, the circumferential end portion 502a of the second part 502 is offset downward (i.e., toward the stator core 20) in the axial direction Y1 from a connection portion 502b of the second part 502; in the connection portion 502b, there are formed the connection terminals 51W and 52W.

Specifically, as shown in FIG. 4, the axial length of the second extending portion 56 is set so that after the first neutral busbar 451 is stacked on the U-phase, V-phase and W-phase busbars 40U-40W, the circumferential end portion 502a of the second part 502 is located at substantially the same axial position as the V-phase busbar 40V that is arranged at the lower layer in the stack of the U-phase, V-phase and W-phase busbars 40U-40W.

The bent part 53 is formed radially outside the main body 50 to protrude radially outward from the main body 50. Specifically, the bent part 53 is formed in a substantially U-shape by being bent back in the axial direction Y1 (i.e., along the direction indicated by the dashed-line arrow in FIG. 6). The bent part 53 has a pair of first and second opening end portions 53a and 53b connected respectively with the circumferential end portion 501a of the first part 501 and the circumferential end portion 502a of the second part 502.

In the bent part 53, the pair of first and second opening end portions 53a and 53b are located radially innermost while a bottom portion 53c of the bent part 53 is located radially outermost. Moreover, of the pair of first and second opening end portions 53a and 53b of the bent part 53, the first opening end portion 53a located on the upper side (i.e., the opposite side to the stator core 20) in the axial direction Y1 is connected with a radially outer periphery of the circumferential end portion 501a of the first part 501 while the second opening end portion 53b located on the lower side (i.e., the stator core 20 side) in the axial direction Y1 is connected with a radially outer periphery of the circumferential end portion 502a of the second part 502.

In addition, as described previously, the circumferential end portion 501a of the first part 501 and the circumferential end portion 502a of the second part 502 are respectively offset downward (i.e., toward the stator core 20) in the axial direction Y1 from the connection portion 501b of the first part 501 and the connection portion 502b of the second part 502 by the first and second extending portions 55 and 56. Accordingly, the bent part 53 is offset downward in the axial direction Y1 from both the connection portion 501b of the first part 501 and the connection portion 502b of the second part 502. Consequently, as shown in FIG. 4, the bent part 53 is located between the W-phase busbar 40W arranged at the intermediate layer and the V-phase busbar 40V arranged at the lower layer in the axial direction Y1.

As described above, in the first neutral busbar 451, the bent part 53 is formed between the first part 501 and the second part 502 so as to electrically connect the first part 501 and the second part 502. Consequently, electric current, which has been inputted from the U-phase and V-phase windings 30U and 30V of the stator coil 30 to the connection terminals 51U, 52U, 51V and 52V, flows through the electrical path of the connection portion 501b of the first part 501→the first extending portion 55→the circumferential end portion 501a of the first part 501→the bent part 53→the circumferential end portion 502a of the second part 502→the second extending portion 56→the connection portion 502b of the second part 502→the connection terminals 51W and 52W, then being outputted to the W-phase winding 30W of the stator coil 30 from the connection terminals 51W and 52W. Otherwise, electric current, which has been inputted from the W-phase winding 30W of the stator coil 30 to the connection terminals 51W and 52W, flows through the electrical path of the connection portion 502b of the second part 502→the second extending portion 56→the circumferential end portion 502a of the second part 502→the bent part 53→the circumferential end portion 501a of the first part 501→the first extending portion 55→the connection portion 501b of the first part 501→the connection terminals 51U, 52U, 51V and 52V, then being outputted to the U-phase and V-phase windings 30U and 30V of the stator coil 30 from the connection terminals 51U, 52U, 51V and 52V.

Moreover, the first extending portion 55 is formed between that portion (i.e., the circumferential end portion 501a) of the first part 501 which is connected with the bent part 53 and the connection terminal 52V that is located closest to the bent part 53 in the circumferential direction Y3 among the plurality of connection terminals formed in the first part 501. Similarly, the second extending portion 56 is formed between that portion (i.e., the circumferential end portion 502a) of the second part 502 which is connected with the bent part 53 and the connection terminal 51W that is located closest to the bent part 53 in the circumferential direction Y3 among the plurality of connection terminals formed in the second part 502.

Figure 7:
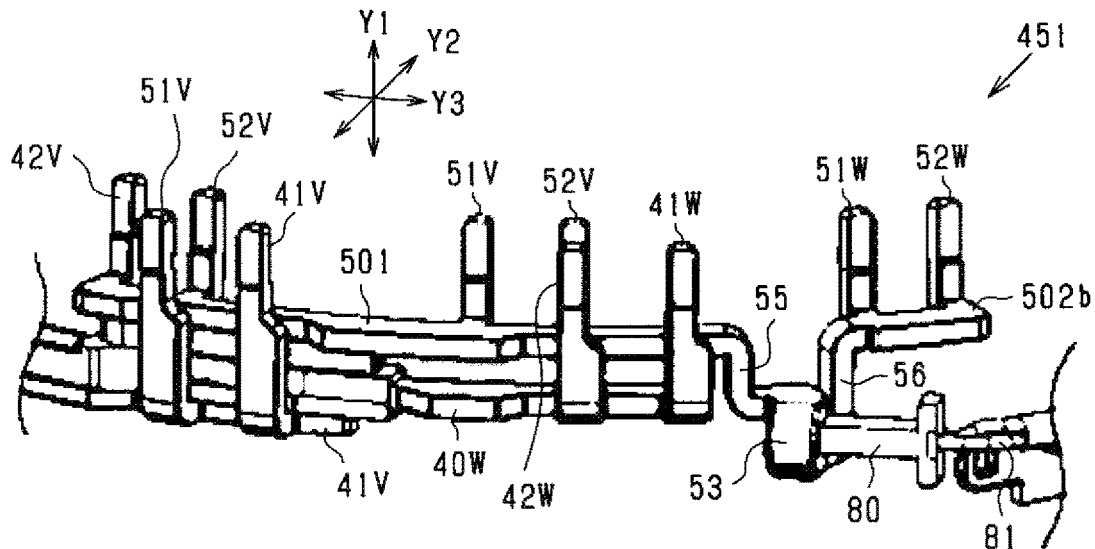
FIG. 7 is a perspective view illustrating the manner of mounting a temperature sensor to the first neutral busbar.

As shown FIG. 7, the bent part 53 of the first neutral busbar 451 fixes the temperature sensor 80 by sandwiching the temperature sensor 80 from both axial sides thereof. Therefore, the bent part 53 is formed to have a pair of sandwiching surfaces 53d which extend perpendicular to the axial direction Y1 and between which the temperature sensor 80 is sandwiched. The temperature sensor 80 is inserted inside the bent part 53 from a circumferential side of the bent part 53. More specifically, the temperature sensor 80 is inserted inside the bent part 53 in the circumferential direction Y3 from the first circumferential end of the busbar unit 40 to the circumferential center of the busbar unit 40.

In the second neutral busbar 452, there are formed six connection terminals 53U, 54U, 53V, 54V, 53W and 54W to be respectively connected to the neutral-point-side end portions of the partial windings 33U and 34U of the U-phase winding 30U, the partial windings 31V and 32V of the V-phase winding 30V and the partial windings 31W and 32W of the W-phase winding 30W. In addition, as shown in FIG. 3, the neutral-point-side end portions of the partial windings 33U and 34U connected with the second neutral busbar 452 are respectively on the opposite side to the non-neutral-point-side end portions of the partial windings 33U and 34U connected with the U-phase busbar 40U; the neutral-point-side end portions of the partial windings 31V and 32V connected with the second neutral busbar 452 are respectively on the opposite side to the non-neutral-point-side end portions of the partial windings 31V and 32V connected with the V-phase busbar 40V; and the neutral-point-side end portions of the partial windings 31W and 32W connected with the second neutral busbar 452 are respectively on the opposite side to the non-neutral-point-side end portions of the partial windings 31W and 32W connected with the W-phase busbar 40W.

As shown in FIG. 4, the connection terminals 53U, 54U, 53V, 54V, 53W and 54W of the second neutral busbar 452 are formed in the same manner as the connection terminals 51U, 52U, 51V, 52V, 51W and 52W of the first neutral busbar 451. Moreover, the second neutral busbar 452 is arranged apart from the first neutral busbar 451 in the circumferential direction Y3 so that the connection terminals 51U, 52U, 51V, 52V, 51W and 52W of the first neutral busbar 451 and the connection terminals 53U, 54U, 53V, 54V, 53W and 54W of the second neutral busbar 452 are symmetrically located with respect to a central axis of the cylindrical stator 10 (or the axis of rotation of the rotor).

The second neutral busbar 452 has a portion thereof radially overlapping the W-phase connection terminals 43W and 44W of the W-phase busbar 40W. Therefore, it is necessary to reliably secure electrical insulation between the second neutral busbar 452 and the W-phase connection terminals 43W and 44W. To this end, that portion of the second neutral busbar 452 which radially overlaps the W-phase connection terminals 43W and 44W is formed as a recessed portion 54c that is recessed radially inward so as to allow the W-phase connection terminals 43W and 44W to axially extend on the radially outer side of the second neutral busbar 452 without making contact with the second neutral busbar 452.

Moreover, the second neutral busbar 452 also has a portion thereof radially overlapping the V-phase connection terminals 43V and 44V of the V-phase busbar 40V. Therefore, it is necessary to reliably secure electrical insulation between the second neutral busbar 452 and the V-phase connection terminals 43V and 44V. To this end, that portion of the second neutral busbar 452 which radially overlaps the V-phase connection terminals 43V and 44V is formed as a recessed portion 54d that is recessed radially inward so as to allow the V-phase connection terminals 43V and 44V to axially extend on the radially outer side of the second neutral busbar 452 without making contact with the second neutral busbar 452.

In the present embodiment, the busbar unit 40 is formed by stacking all of the U-phase, V-phase and W-phase busbars 40U-40W and the neutral busbar 45 (i.e., the first and second neutral busbars 451 and 452) in the axial direction Y1 and covering them in the stacked state with the resin member 60 and thereby integrating them into one piece. As shown in FIG. 5, the resin member 60 covers the U-phase, V-phase and W-phase busbars 40U-40W and the neutral busbar 45 such that the connection terminals 41U-44U, 41V-44V, 41W-44W, 51U-54U, 51V-54V and 51W-54W are exposed from the resin member 60. More specifically, each of the connection terminals 41U-44U, 41V-44V, 41W-44W, 51U-54U, 51V-54V and 51W-54W protrudes from the resin member 60 radially inward or radially outward and then axially extends, in the exposed state, to the opposite side to the stator core 20.

The resin member 60 is formed in an arc shape along the circumferential direction Y3 to cover the busbars 40U-40W and 45. More specifically, the resin member 60 covers the busbars 40U-40W and 45 so as to have gaps between the busbars 40U-40W and 45 in the axial direction Y1 filled with the resin forming the resin member 60. Consequently, it becomes possible to keep the axial distances between the busbars 40U-40W and 45 constant, thereby electrically insulating them from one another.

Figure 8:
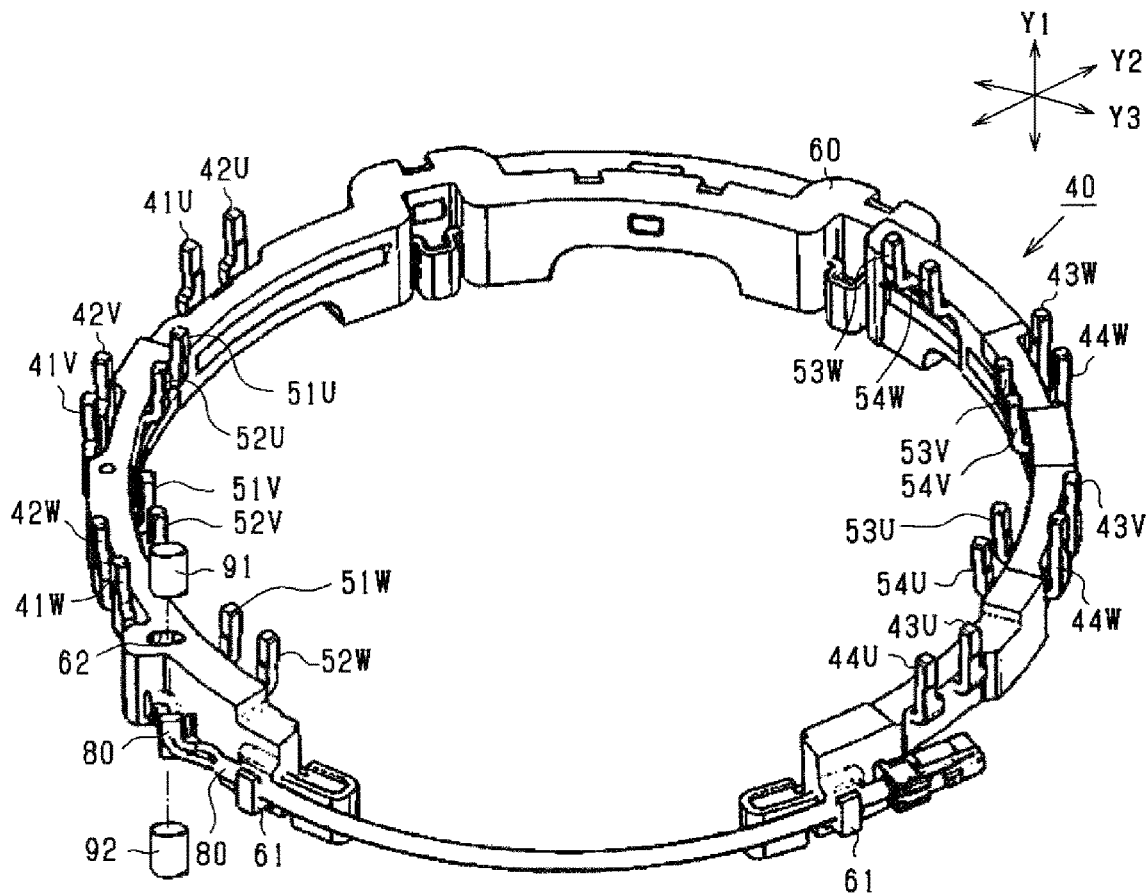
FIG. 8 is a perspective view showing the busbar unit and a pair of first and second pressing members used to press a bent part of the first neutral busbar and the temperature sensor together during the molding of a resin member of the busbar unit.

In addition, as shown in FIG. 8, the resin member 60 is formed to cover at least part of the temperature sensor 80 along with the first neutral busbar 451, thereby integrating the temperature sensor 80 with the first neutral busbar 451 into one piece. As described previously, the temperature sensor 80 is sandwiched in the bent part 83 of the first neutral busbar 451.

Figure 9:
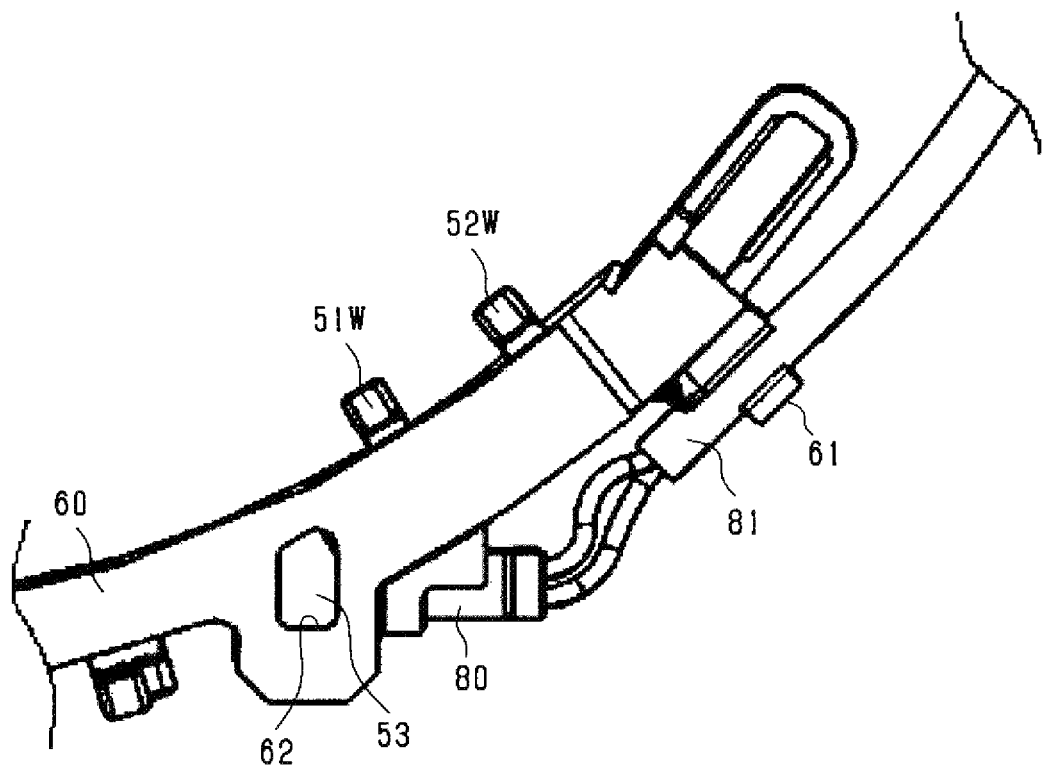
FIG. 9 is a plan view of part of the busbar unit.

Moreover, in circumferential end portions of the resin member 60, there are respectively formed a pair of hooks 61 as holding members for holding a lead wire 81 of the temperature sensor 80. Each of the hooks 61 is formed as an integral part of the resin member 60 by resin molding. That is, the hooks 61 are formed of a resin. Moreover, as shown in FIGS. 8 and 9, each of the hooks 61 is bent upward in the axial direction Y1 and elastically deformed to have the lead wire 81 sandwiched therein. Furthermore, each of the hooks 61 has a substantially J-shaped contact surface (i.e., interior surface) for making contact with the lead wire 81. The contact surface is formed as a smooth flat surface or a smooth curved surface, in other words, formed as a flat or curved surface without any concavities/convexities engageable with the lead wire 81. In addition, each of the hooks 61 may alternatively be formed in a substantially L-shape or formed as a protrusion.

Figure 10:
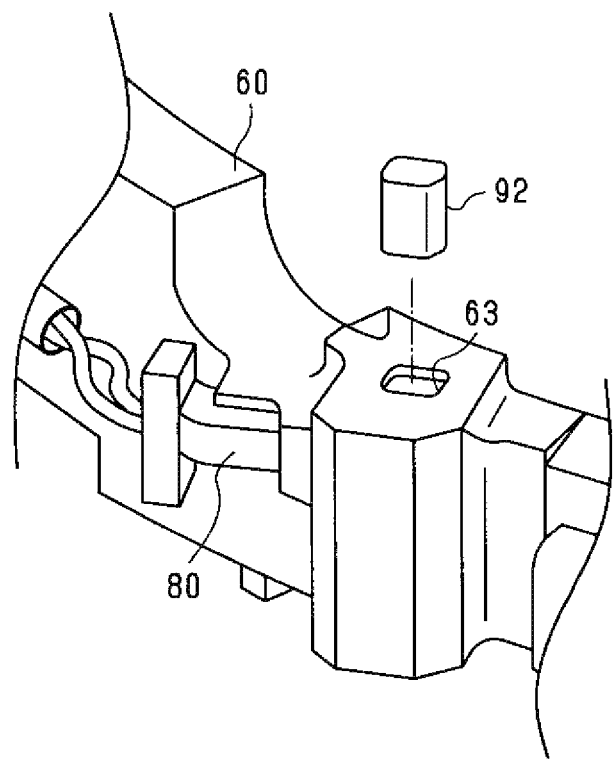
FIG. 10 is a perspective view showing part of the busbar unit and the second pressing member.

As shown in FIGS. 8-10, in those portions of the resin member 60 which cover the bent part 53 of the first neutral busbar 451, there are formed a pair of first and second through-holes 62 and 63 each penetrating the resin member 60 in the axial direction Y1.

In addition, FIG. 8 is a perspective view of the busbar unit 40 from the upper side (i.e., the opposite side to the stator core 20) in the axial direction Y1. FIG. 9 is a plan view of part of the busbar unit 40 from the upper side (i.e., the opposite side to the stator core 20) in the axial direction Y1, showing the first through-hole 62 formed in the resin member 60. FIG. 10 is a perspective view of part of the busbar unit 40 from the lower side (i.e., the stator core 20 side) in the axial direction Y1, showing the second through-hole 63 formed in the resin member 60.

As shown in FIG. 9, of the pair of first and second through-holes 62 and 63 formed in the resin member 60, the first through-hole 62 is formed in that portion of the resin member 60 which covers the bent part 53 of the first neutral busbar 451 from the upper side in the axial direction Y1. Consequently, an upper surface (more specifically, upper exterior surface) of the bent part 53 of the first neutral busbar 451 in the axial direction Y1 is exposed through the first through-hole 62. Moreover, as shown in FIG. 10, of the pair of first and second through-holes 62 and 63 formed in the resin member 60, the second through-hole 63 is formed in that portion of the resin member 60 which covers the bent part 53 of the first neutral busbar 451 from the lower side in the axial direction Y1. Consequently, a lower surface (more specifically, lower exterior surface) of the bent part 53 of the first neutral busbar 451 in the axial direction Y1 is exposed through the second through-hole 63.

In the present embodiment, the first and second through-holes 62 and 63 are formed in the following manner. In the process of covering the first neutral busbar 451 with a resin, the first neutral busbar 451, which has the temperature sensor 80 retained in the bent part 53 thereof, is placed in a cavity formed in a metal mold. Then, resin molding is performed by injecting the resin under a high pressure into the cavity of the metal mold. However, during the resin molding, the first neutral busbar 451 may be bent or shaken due to the high resin-injection pressure, causing the bent part 53 thereof to be distorted. Consequently, the force of the bent part 53 retaining the temperature sensor 80 may be weakened, causing the temperature sensor 80 sandwiched in the bent part 53 to be displaced and/or resulting in insufficient contact between the temperature sensor 80 and the bent part 53.

In view of the above, in the present embodiment, the resin molding is performed with the upper and lower surfaces of the bent part 53 pressed respectively by a pair of first and second pressing members 91 and 92 (see FIGS. 8 and 10) from opposite axial sides of the bent part 53 in the cavity of the metal mold; both the first and second pressing members 91 and 92 are substantially cylindrical in shape. Consequently, it becomes possible to reliably retain the temperature sensor 80 in the bent part 53 during the resin molding, thereby suppressing displacement of the temperature sensor 80 and preventing the contact between the temperature sensor 80 and the bent part 53 from becoming insufficient. Further, after completion of the resin molding, both the first and second pressing member 91 and 92 are removed from the resultant resin member 60. Consequently, in the resin member 60, there are formed the first and second through-holes 62 and 63 respectively at the locations where the first and second pressing members 91 and 92 were placed to press the bent part 53 during the resin molding.

That is, the first and second through-holes 62 and 63, through which the upper and lower surfaces of the bent part 53 are respectively exposed from the resin member 60 in the axial direction Y1, respectively correspond to the first and second pressing members 91 and 92 used to respectively press the upper and lower surfaces of the bent part 53 during the resin molding.

Figure 11:
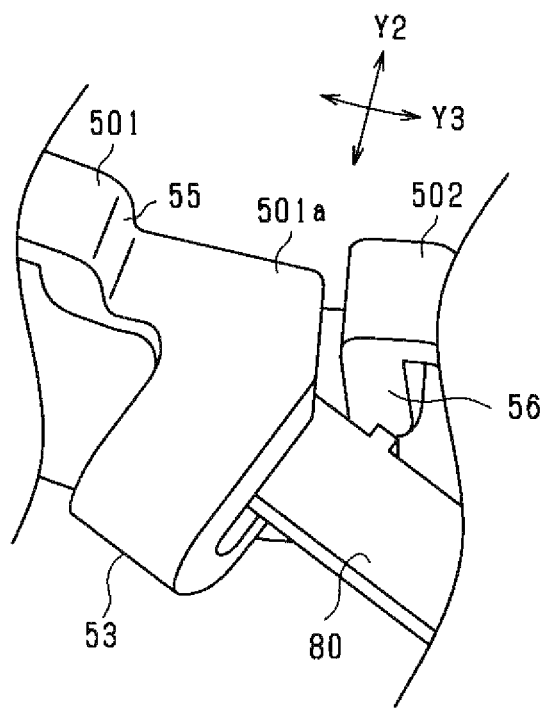
FIG. 11 is a perspective view of part of the first neutral busbar illustrating a problem which may occur during the molding of the resin member.

Moreover, as shown in FIG. 11, in the first neutral busbar 451, the circumferential end portion 501*a* of the first part 501 is separated from and faces the second extending portion 56 in the circumferential direction Y3. However, the separation distance between the circumferential end portion 501*a* of the first part 501 and the second extending portion 56 is very short. Therefore, if the first neutral busbar 451 is distorted due to the high resin-injection pressure during the resin molding, the circumferential end portion 501*a* of the first part 501 and the second extending portion 56 may be brought into contact with each other and resin-molded in the state of being in contact with each other. Consequently, a short circuit would be formed due to the contact between the circumferential end portion 501*a* of the first part 501 and the second extending portion 56, causing electric current to flow from the circumferential end portion 501*a* of the first part 501 to the second part 502 via the second extending portion 56 without passing through the bent part 53. As a result, it would become impossible to have the temperature sensor 80 arranged in the electric current path; thus the accuracy of detecting the temperature of the stator coil 30 by the temperature sensor 80 would be lowered.

In view of the above, in the present embodiment, the shape and pressing position of the first pressing member 91, which presses the upper surface of the first opening end portion 53*a* of the bent part 53 during the resin molding, are set so that the first pressing member 91 protrudes, between the circumferential end portion 501*a* of the first part 501 and the second extending portion 56, from the circumferential end portion 501*a* of the first part 501 toward the second extending portion 56. Consequently, during the resin molding, if the first neutral busbar 451 is distorted and thereby causes the second extending portion 56 to approach the circumferential end portion 501*a* of the first part 501, the first pressing member 91 will interfere with the second extending portion 56, thereby preventing the second extending portion 56 from making contact with the circumferential end portion 501*a* of the first part 501.

Figure 12:
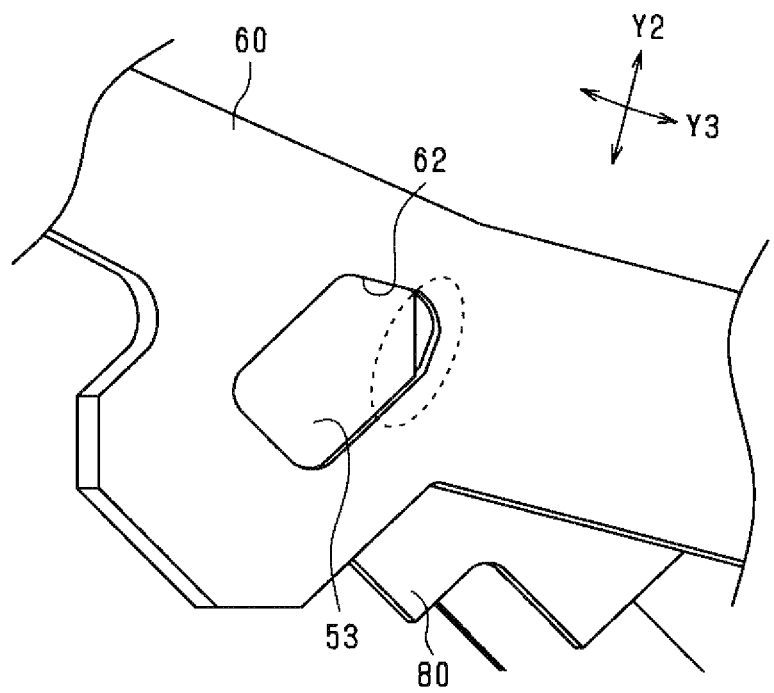
FIG. 12 is a perspective view showing a first through-hole formed in the resin member.

Accordingly, in the present embodiment, the first through-hole 62, which is formed in the resin member 60 by removing the first pressing member 91 therefrom, has such a shape as to protrude, between the circumferential end portion 501*a* of the first part 501 and the second extending portion 56, from the circumferential end portion 501*a* of the first part 501 toward the second extending portion 56 as indicated by a dashed line in FIG. 12.

According to the present embodiment, it is possible to achieve the following advantageous effects.

In the rotating electric machines disclosed in the aforementioned Patent Documents 1 and 2, a temperature sensor is mounted to a neutral busbar to detect the temperature of the stator coil (or armature coil). The detected temperature of the stator coil is used for controlling the supply of electric current to the stator coil and for preventing a failure from occurring due to overheating of the stator coil. Therefore, it is necessary to accurately detect the temperature of the stator coil. Accordingly, it is desirable for the temperature sensor to be arranged in the electric current path in the neutral busbar. That is, it is desirable for the temperature sensor to be arranged between connection terminals of different phases. Moreover, to reliably place the temperature sensor in contact with the neutral busbar and fix them together in the state of being in contact with each other, the temperature sensor is retained in a substantially U-shaped bent part of the neutral busbar. Furthermore, during the assembly of the neutral busbar to the stator (or armature), the radial and/or circumferential positions of the connection terminals of the neutral busbar are generally adjusted so as to allow the connection terminals to be respectively joined to winding end portions of the stator coil. However, during the position adjustment of the connection terminals, strain may be induced in the bent part of the neutral busbar, causing the opening of the substantially U-shaped bent part to spread. Consequently, it would become difficult to reliably retain the temperature sensor in the bent part of the neutral busbar. As a result, it would become difficult to reliably suppress displacement of the temperature sensor; it would also become difficult to reliably keep the temperature sensor in contact with the bent part of the neutral busbar.

In view of the above, in the present embodiment, the first neutral busbar 451 is configured to have the main body 50 extending in the circumferential direction Y3, the connection terminals 51U, 52U, 51V, 52V, 51W and 52W formed in the main body 50 and joined respectively to the neutral-point-side end portions of the partial windings 31U, 32U, 33V, 34V, 33W and 34W of the stator coil 30, and the bent part 53 sandwiching and thereby retaining the temperature sensor 80 therein. The main body 50 has the first part 501 and the second part 502 apart from each other in the circumferential direction Y3. The first part 501 has the connection terminals 51U, 52U, 51V and 52V formed in the connection portion 501b thereof, while the second part 502 has the connection terminals 51W and 52W formed in the connection portion 502b thereof. The bent part 53 is formed between the circumferential end portion 501a of the first part 501 and the circumferential end portion 502a of the second part 502 to electrically connect the first and second parts 501 and 502. In the first part 501, there is formed the first extending portion 55 between the circumferential end portion 501a of the first part 501 and the connection terminal 52V that is located closest to the bent part 53 among all the connection terminals 51U, 52U, 51V and 52V formed in the first part 501; the first extending portion 55 extends in the axial direction Y1. On the other hand, in the second part 502, there is formed the second extending portion 56 between the circumferential end portion 502a of the second part 502 and the connection terminal 51W that is located closer than the connection terminal 52W to the bent part 53; the second extending portion 56 also extends in the axial direction Y1.

With the above configuration, when the connection portion 501b of the first part 501, which has the connection terminals 51U, 52U, 51V and 52V formed therein, is slightly deformed, strain induced by the deformation will be absorbed by the first extending portion 55. Similarly, when the connection portion 502b of the second part 502, which has the connection terminals 51W and 52W formed therein, is slightly deformed, strain induced by the deformation will be absorbed by the second extending portion 56.

Consequently, it becomes possible to suppress deformation of the bent part 53 when the positions of the connection terminals 51U, 52U, 51V, 52V, 51W and 52W are adjusted to allow these connection terminals to be respectively joined to the neutral-point-side end portions of the partial windings 31U, 32U, 33V, 34V, 33W and 34W of the stator coil 30. That is, the first and second extending portions 55 and 56 serve as buffer members to absorb strain induced in the first and second parts 501 and 502 during the position adjustment of the connection terminals 51U, 52U, 51V, 52V, 51W and 52W. Accordingly, it becomes possible to suppress displacement of the temperature sensor 80 due to deformation of the bent part 53; it also becomes possible to prevent the contact between the temperature sensor 80 and the bent part 53 from becoming insufficient due to deformation of the bent part 53. As a result, it becomes possible to prevent the accuracy of detecting the temperature of the stator coil 30 by the temperature sensor 80 from being lowered.

Moreover, in the present embodiment, the bent part 53 of the first neutral busbar 451 has the pair of sandwiching surfaces 53d between which the temperature sensor 80 is sandwiched. Both the sandwiching surfaces 53d of the bent part 53 are formed to extend perpendicular to the axial direction Y1.

Consequently, it becomes possible to place the temperature sensor 80 in surface contact with the bent part 53 of the first neutral busbar 451; thus it becomes easy to position the temperature sensor 80 in the axial direction Y1.

In the present embodiment, the bent part 53 of the first neutral busbar 451 is formed to protrude radially outward from the main body 50 of the first neutral busbar 451 and bent back in the axial direction Y1 into the substantially U-shape.

Consequently, the bent part 53 opens on the radially inner side as well as on both the circumferential sides. As a result, it becomes possible to adjust the mounting angle of the temperature sensor 80 in the radial direction and/or the circumferential direction, thereby facilitating the mounting of the temperature sensor 80 to the bent part 53 of the first neutral busbar 45.

Moreover, in the present embodiment, the bent part 53 of the first neutral busbar 451 has the first opening end portion 53a connected with the circumferential end portion 501a of the first part 501 of the main body 50 and the second opening end portion 53b connected with the circumferential end portion 502a of the second part 502 of the main body 50. Both the first neutral busbar 451 and the temperature sensor 80 are covered with the resin member 60 and thereby integrated into one piece. The resin member 60 has the pair of first and second through-holes 62 and 63 through which the first and second opening end portions 53a and 53b of the bent part 53 are respectively exposed from the resin member 60 in the axial direction Y1. The pair of first and second through-holes 62 and 63 respectively correspond to the pair of first and second pressing members 91 and 92 used to press the bent part 53 of the first neutral busbar 451 and the temperature sensor 80 together respectively from opposite axial sides of the bent part 53 during the resin molding of the resin member 60.

With the above configuration, it becomes possible to cover both the first neutral busbar 451 and the temperature sensor 80 with the resin member 60 while pressing the bent part 53 of the first neutral busbar 451 and the temperature sensor 80 together using the pair of first and second pressing members 91 and 92. Consequently, it becomes possible to locate the temperature sensor 80 at a desired position; it also becomes possible to reliably place the temperature sensor 80 in contact with the bent part 53 of the first neutral busbar 451.

Furthermore, in the present embodiment, the circumferential end portion 501a of the first part 501 and the second extending portion 56 face each other in the circumferential direction Y3. The first through-hole 62 is formed in the resin member 60 so as to protrude, between the circumferential end portion 501a of the first part 501 and the second extending portion 56, from the circumferential end portion 501a of the first part 501 toward the second extending portion 56. That is, during the resin molding of the resin member 60, the first pressing member 91 corresponding to the first through-hole 62 is provided to protrude, between the circumferential end portion 501a of the first part 501 and the second extending portion 56, from the circumferential end portion 501a of the first part 501 toward the second extending portion 56.

With the above configuration, during the resin molding, if the first neutral busbar 451 is distorted and thereby causes the second extending portion 56 to approach the circumferential end portion 501a of the first part 501, the first pressing member 91 will interfere with the second extending portion 56, thereby preventing the second extending portion 56 from making contact with the circumferential end portion 501a of the first part 501. Consequently, it becomes possible to prevent a short circuit from being formed between the first and second parts 501 and 502; thus it becomes possible to prevent electric current from flowing between the first and second parts 501 and 502 without passing through the bent part 53. In other words, it becomes possible to reliably have electric current flow between the first and second parts 501 and 502 through the bent part 53. As a result, it becomes possible to reliably prevent the accuracy of detecting the temperature of the stator coil 30 by the temperature sensor 80 from being lowered.

In the present embodiment, both the first neutral busbar 451 and the temperature sensor 80 are covered with the resin member 60 and thereby integrated into one piece. In the circumferential end portions of the resin member 60, there are respectively formed the pair of hooks 61 as holding members for holding the lead wire 81 of the temperature sensor 80.

With the hooks 61 holding (or temporarily fixing) the lead wire 81, during delivery of the busbar unit 40 before connection of the lead wire 81 to the temperature sensor 80, it is possible to prevent the lead wire 81 from hanging from the busbar unit 40 and thus from hindering the assembly of the busbar unit 40 to the stator 10.

In the present embodiment, each of the hooks 61 is formed as an integral part of the resin member 60 by resin molding. Moreover, each of the hooks 61 has the substantially J-shaped contact surface for making contact with the lead wire 81. The contact surface is formed as a smooth flat surface or a smooth curved surface.

With the above configuration, there are no undercuts in the contact surfaces of the hooks 61. Therefore, the hooks 61 can be easily resin-molded along with the resin member 61.

In the present embodiment, the axial lengths of the first and second extending portions 55 and 56 are set so that after the first neutral busbar 451 is stacked on the U-phase, V-phase and W-phase busbars 40U-40W, both the circumferential end portion 501*a* of the first part 501 and the circumferential end portion 502*a* of the second part 502 are axially located within the range of the axial dimension of the stack of the U-phase, V-phase and W-phase busbars 40U-40W. More specifically, the axial length of the first extending portion 55 is set so that the circumferential end portion 501*a* of the first part 501 is located at substantially the same axial position as the W-phase busbar 40W that is arranged at the intermediate layer in the stack of the U-phase, V-phase and W-phase busbars 40U-40W. On the other hand, the axial length of the second extending portion 56 is set so that the circumferential end portion 502*a* of the second part 502 is located at substantially the same axial position as the V-phase busbar 40V that is arranged at the lower layer in the stack of the U-phase, V-phase and W-phase busbars 40U-40W. Moreover, in the present embodiment, each of the first and second extending portions 55 and 56 is formed to extend straight in the axial direction Y1.

With the above configuration of the first and second extending portions 55 and 56, it becomes possible to minimize the axial and radial dimensions of the busbar unit 40.

While the above particular embodiment has been shown and described, it will be understood by those skilled in the art that various modifications, changes and improvements may be made without departing from the spirit of the present disclosure.

For example, in the above-described embodiment, the neutral busbar 45 is integrated, together with the U-phase, V-phase and W-phase busbars 40U-40W, into the busbar unit 40. Alternatively, the neutral busbar 45 may not be integrated into the busbar unit 40.

In the above-described embodiment, the U-phase, V-phase and W-phase busbars 40U-40W and the neutral busbar 45 are stacked in the axial direction Y1 in the order of the V-phase busbar 40V, the W-phase busbar 40W, the U-phase busbar 40U and the neutral busbar 45 from the stator core 20 side. However, the stacking order of the U-phase, V-phase and W-phase busbars 40U-40W and the neutral busbar 45 may be arbitrarily changed.

In the above-described embodiment, the U-phase, V-phase and W-phase busbars 40U-40W and the neutral busbar 45 are offset from one another in the circumferential direction Y3. Alternatively, the U-phase, V-phase and W-phase busbars 40U-40W and the neutral busbar 45 may not be offset from one another in the circumferential direction Y3.

In the above-described embodiment, the neutral busbar 45 is formed of a flat wire that is radially flattened. As an alternative, the neutral busbar 45 may be formed of a flat wire that is axially flattened. As another alternative, the neutral busbar 45 may be formed of a wire having a circular or elliptical cross-sectional shape.

In the above-described embodiment, each of the first and second extending portions 55 and 56 of the first neutral busbar 451 is formed to extend in the axial direction Y1. Alternatively, each of the first and second extending portions 55 and 56 of the first neutral busbar 451 may be formed to extend in a radial direction Y2.

In the above-described embodiment, in the first neutral busbar 451, the bent part 53 is formed to protrude radially outward from the main body 50. Alternatively, the bent part 53 may be formed to protrude radially inward from the main body 50.

In the above-described embodiment, the axial lengths of the first and second extending portions 55 and 56 are set so that after the first neutral busbar 451 is stacked on the U-phase, V-phase and W-phase busbars 40U-40W, the circumferential end portion 501*a* of the first part 501 and the circumferential end portion 502*a* of the second part 502 are axially located within the range of the axial dimension of the stack of the U-phase, V-phase and W-phase busbars 40U-40W. However, the axial lengths of the first and second extending portions 55 and 56 may be arbitrarily changed. For example, the axial lengths of the first and second extending portions 55 and 56 may alternatively be set to have the bent part 53 of the first neutral busbar 451 located on the lower side (i.e., the stator core 20 side) of the U-phase, V-phase and W-phase busbars 40U-40W in the axial direction Y1. Otherwise, the first and second extending portions 55 and 56 may alternatively be formed to extend upward respectively from the connection portions 501*b* and 502*b* of the first and second parts 501 and 502 in the axial direction Y1. In addition, the bent part 53 of the first neutral busbar 451 may alternatively be located on the upper side of the U-phase, V-phase and W-phase busbars 40U-40W (i.e., the opposite side of the U-phase, V-phase and W-phase busbars 40U-40W to the stator core 20) in the axial direction Y1.

In the above-described embodiment, the first part 501 of the first neutral busbar 451 has the recessed portions 54*a* and 54*b* formed therein. Alternatively, the first part 501 of the first neutral busbar 45 may have no recessed portions 54*a* and 54*b* formed therein.

In the above-described embodiment, the bent part 53 of the first neutral busbar 451 is bent back in the axial direction Y1 into the substantially U-shape. Alternatively, the bent part 53 of the first neutral busbar 451 may be bent back in a radial direction Y2 into the substantially U-shape.

In the above-described embodiment, the resin molding of the resin member 60 is performed with the first and second pressing members 91 and 92 respectively pressing the upper and lower surfaces of the bent part 53. Alternatively, the resin molding may be performed without the first and second pressing members 91 and 92 respectively pressing the upper and lower surfaces of the bent part 53. In this case, no through-holes 62 and 63 would be formed respectively in the upper and lower surfaces of the bent part 53.

In the above-described embodiment, the first pressing member 91 is shaped so as to protrude, between the circumferential end portion 501*a* of the first part 501 and the second extending portion 56, from the circumferential end portion 501a of the first part 501 toward the second extending portion 56. Alternatively, the first pressing member 91 may be shaped so as not to protrude from the circumferential end portion 501a of the first part 501 toward the second extending portion 56. In this case, the first through-hole 62 corresponding to the first pressing member 91 would also be shaped so as not to protrude from the circumferential end portion 501a of the first part 501 toward the second extending portion 56.

In the above-described embodiment, in the circumferential end portions of the resin member 60, there are respectively formed the pair of hooks 61 as holding members for holding the lead wire 81 of the temperature sensor 80. However, the number and locations of the hooks 61 may be arbitrarily changed. Moreover, the busbar unit 40 may have no hook 61 formed therein.

In the above-described embodiment, the rotating electric machine is configured as an electric motor for use in a vehicle. However, the rotating electric machine may alternatively be configured as an electric motor for other uses, for example as an electric motor for use in an aircraft.

What is claimed is:

1. A rotating electric machine comprising:
    an armature including an annular armature core and a three-phase armature coil wound on the armature core and Y-connected to define a neutral point thereof;
    a neutral busbar configured to connect neutral-point-side winding end portions of the armature coil; and
    a temperature sensor mounted to the neutral busbar to detect a temperature of the armature coil,
    wherein
    the neutral busbar has a main body extending in a circumferential direction of the armature, a plurality of connection terminals formed in the main body and joined respectively to the neutral-point-side winding end portions of the armature coil, and a bent part sandwiching and thereby retaining the temperature sensor therein,
    the main body of the neutral busbar has a first part and a second part located apart from each other in the circumferential direction and each having one or more of the connection terminals formed therein,
    the bent part is formed between a circumferential end portion of the first part and a circumferential end portion of the second part to electrically connect the first and second parts,
    in the first part, there is formed a first extending portion between the circumferential end portion of the first part and a closest one of the one or more connection terminals formed in the first part to the bent part in the circumferential direction, the first extending portion extending in an axial direction or a radial direction of the armature, and
    in the second part, there is formed a second extending portion between the circumferential end portion of the second part and a closest one of the one or more connection terminals formed in the second part to the bent part in the circumferential direction, the second extending portion also extending in the axial direction or a radial direction of the armature.

2. The rotating electric machine as set forth in claim 1, wherein
    the bent part has a pair of sandwiching surfaces between which the temperature sensor is sandwiched, and
    both the sandwiching surfaces of the bent part are formed to extend perpendicular to the axial direction of the armature.

3. The rotating electric machine as set forth in claim 1, wherein
    the bent part is formed to radially protrude from the main body of the neutral busbar and bent back in the axial direction into a substantially U-shape,
    the bent part has a first opening end portion connected with the circumferential end portion of the first part of the main body and a second opening end portion connected with the circumferential end portion of the second part of the main body,
    both the neutral busbar and the temperature sensor are covered with a resin member and thereby integrated into one piece,
    the resin member has a pair of first and second through-holes through which the first and second opening end portions of the bent part are respectively exposed from the resin member in the axial direction, the pair of first and second through-holes respectively corresponding to a pair of first and second pressing members used to press the bent part of the neutral busbar and the temperature sensor together respectively from opposite axial sides of the bent part during resin molding of the resin member,
    the circumferential end portion of the first part and the second extending portion face each other in the circumferential direction, and
    the first through-hole is formed in the resin member so as to protrude, between the circumferential end portion of the first part and the second extending portion, from the circumferential end portion of the first part toward the second extending portion.

4. The rotating electric machine as set forth in claim 1, wherein
    both the neutral busbar and the temperature sensor are covered with a resin member and thereby integrated into one piece, and
    in the resin member, there is formed at least one hook-shaped holding member to hold a lead wire of the temperature sensor.

5. The rotating electric machine as set forth in claim 4, wherein
    the at least one holding member is formed of a resin and integrally with the resin member into one piece,
    the at least one holding member has a contact surface for making contact with the lead wire of the temperature sensor, and
    the contact surface is formed as a smooth flat surface or a smooth curved surface.

6. An armature comprising:
    an annular armature core;
    a three-phase armature coil wound on the armature core and Y-connected to define a neutral point thereof;
    a neutral busbar configured to connect neutral-point-side winding end portions of the armature coil; and
    a temperature sensor mounted to the neutral busbar to detect a temperature of the armature coil,
    wherein
    the neutral busbar has a main body extending in a circumferential direction of the armature, a plurality of connection terminals formed in the main body and joined respectively to the neutral-point-side winding end portions of the armature coil, and a bent part sandwiching and thereby retaining the temperature sensor therein, the main body of the neutral busbar has a first part and a second part located apart from each other in the circumferential direction and each having one or more of the connection terminals formed therein, the bent part is formed between a circumferential end portion of the first part and a circumferential end portion of the second part to electrically connect the first and second parts, in the first part, there is formed a first extending portion between the circumferential end portion of the first part and a closest one of the one or more connection terminals formed in the first part to the bent part in the circumferential direction, the first extending portion extending in an axial direction or a radial direction of the armature, and in the second part, there is formed a second extending portion between the circumferential end portion of the second part and a closest one of the one or more connection terminals formed in the second part to the bent part in the circumferential direction, the second extending portion also extending in the axial direction or a radial direction of the armature.

\* \* \* \* \*